US010703006B2

(12) United States Patent
Levien et al.

(10) Patent No.: US 10,703,006 B2
(45) Date of Patent: Jul. 7, 2020

(54) HANDHELD WORK APPARATUS HAVING A WORK TOOL AND A BRAKE ASSEMBLY FOR THE WORK TOOL (71) Applicant: Andreas Stihl AG & Co. KG, Waiblingen (DE)

(72) Inventors: Patrick Levien, Ebersbach (DE); Tobias Deigendesch, Backnang (DE); Alexander Klein, Waiblingen (DE); Georg Maier, Kernen (DE); Sebastian Hanussek, Remseck (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 25 days.

(21) Appl. No.: 16/004,185

(22) Filed: Jun. 8, 2018

(65) Prior Publication Data
US 2018/0354152 A1 Dec. 13, 2018

(30) Foreign Application Priority Data

Jun. 9, 2017 (EP) ..................................... 17400037

(51) Int. Cl.
*B27B 5/38* (2006.01)
*F16B 43/02* (2006.01)
(Continued)

(52) U.S. Cl.
CPC ................ *B27B 5/38* (2013.01); *B23D 45/16* (2013.01); *B24B 23/022* (2013.01); *B24B 27/08* (2013.01);
(Continued)

(58) Field of Classification Search
CPC ......... B27B 5/38; B23D 45/16; B24B 23/022; B24B 27/08; B24B 47/26; F16B 5/0241;
(Continued)

(56) References Cited

U.S. PATENT DOCUMENTS 2,889,014 A * 6/1959 Goetz ..................... F16D 49/16
188/171
3,476,223 A 11/1969 Hubbard
(Continued)

FOREIGN PATENT DOCUMENTS

EP 0072610 A2 2/1983
JP 2000009159 A * 1/2000
WO WO-2015180828 A1 * 12/2015

*Primary Examiner* — Kenneth E Peterson
*Assistant Examiner* — Nhat Chieu Q Do
(74) *Attorney, Agent, or Firm* — Walter Ottesen, P.A.

(57) ABSTRACT

A handheld work apparatus has a tool and a brake assembly for the tool. The brake assembly has an actuating element which acts on a brake element of the brake assembly. The actuating element is movable between a fixed position wherein the tool is not braked, and a released position, wherein the brake element brakes the tool. To fix the actuating element in the fixed position, an electromagnet is provided. The electromagnet interacts with an anchor on the actuating element. The anchor is mounted via a pivot joint on an anchor pin to be pivotable about a pivot axis. A guide includes a guide part connected to the anchor and a guide part connected to the yoke, wherein, in the fixed position of the actuating element, the guide parts guide the anchor relative to the yoke in a transverse direction of an outrigger of the apparatus.

8 Claims, 8 Drawing Sheets (51) Int. Cl.
  *B24B 23/02*    (2006.01)
  *F16B 5/02*     (2006.01)
  *B24B 27/08*    (2006.01)
  *B24B 47/26*    (2006.01)
  *B23D 45/16*    (2006.01)
  *F16D 49/08*    (2006.01)
  *F16D 65/16*    (2006.01)
  *F16B 43/00*    (2006.01)
  *B28D 1/24*     (2006.01)
  *B28D 7/02*     (2006.01)
  *F16D 121/22*   (2012.01)

(52) U.S. Cl.
  CPC ............ *B24B 47/26* (2013.01); *F16B 5/0241* (2013.01); *F16B 43/02* (2013.01); *F16D 49/08* (2013.01); *F16D 65/16* (2013.01); *B28D 1/24* (2013.01); *B28D 7/02* (2013.01); *F16B 43/001* (2013.01); *F16D 2121/22* (2013.01)

(58) Field of Classification Search
  CPC .......... F16B 43/42; F16B 43/02; F16D 49/08; F16D 65/16; F16D 59/02
  USPC ........................................... 30/383
  See application file for complete search history.

(56) References Cited

U.S. PATENT DOCUMENTS

| | | | | |
|---|---|---|---|---|
| 4,402,138 | A * | 9/1983 | Glockle | F16P 7/02 |
| | | | | 200/61.45 M |
| 4,432,139 | A * | 2/1984 | Kohler | F16D 49/08 |
| | | | | 30/381 |
| 4,573,556 | A * | 3/1986 | Andreasson | B27B 17/083 |
| | | | | 188/137 |
| 4,683,660 | A * | 8/1987 | Schurr | B27B 17/083 |
| | | | | 30/381 |
| 4,757,881 | A * | 7/1988 | Jonsson | B23D 59/008 |
| | | | | 188/171 |
| 5,101,567 | A * | 4/1992 | Cool | B27B 17/083 |
| | | | | 200/61.85 |
| 5,709,032 | A * | 1/1998 | Mizutani | B27B 17/083 |
| | | | | 188/77 R |
| 2009/0193669 | A1* | 8/2009 | Gorenflo | B27B 17/083 |
| | | | | 30/382 |
| 2012/0036725 | A1* | 2/2012 | Osborne | B27B 17/083 |
| | | | | 30/383 |
| 2013/0259600 | A1 | 10/2013 | Kerechanin, II | |
| 2016/0377109 | A1 | 12/2016 | Oka | |
| 2017/0066068 | A1 | 3/2017 | Hanussek et al. | |
| 2017/0072482 | A1 | 3/2017 | Hanussek et al. | |

\* cited by examiner

Fig. 15  State of the Art

Fig. 16

HANDHELD WORK APPARATUS HAVING A WORK TOOL AND A BRAKE ASSEMBLY FOR THE WORK TOOL

CROSS REFERENCE TO RELATED APPLICATION

This application claims priority of European patent application no. 17 400 037.2, filed Jun. 9, 2017, the entire content of which is incorporated herein by reference.

FIELD OF THE INVENTION

The invention relates to a handheld work apparatus with a tool and with a brake assembly for the tool.

BACKGROUND OF THE INVENTION

US 2017/0066068 and US 2017/0072482 disclose a work apparatus, namely a cutoff machine. The cutoff machine has a cantilever which is fastened to the engine housing and on which an electromagnet of a brake unit is secured. An actuating element, namely a pivot lever, of the brake unit is mounted at a distance from the electromagnet and bears an anchor which interacts with the electromagnet. In US 2017/0066068 and US 2017/0072482, a variant embodiment makes provision for the anchor, which is held on the actuating element, to be fixed on the actuating element via a damping element. As a result, the anchor is slightly movable in relation to the actuating element in order to compensate for tolerances.

SUMMARY OF THE INVENTION

The invention is based on the object of providing a handheld work apparatus with a work tool and a brake assembly, in which the brake is not inadvertently triggered even in unfavorable working conditions.

It has been shown that vibrations occur during operation, leading to significant relative movements of the electromagnet in relation to the actuating element. The fixing, described in the prior art, of the anchor via a damping element does indeed permit a slight tilting of anchor and anchor pin in relation to the actuating element. If, however, a relative movement between actuating element and electromagnet occurs, the tilting brings about an inclination of the anchor in relation to the electromagnet, which causes a considerable reduction in the holding forces of the electromagnet acting on the anchor. By means of the inclination of the anchor in relation to the electromagnet, the anchor is released from the electromagnet, and the actuating element is adjusted into its released position in which the brake element brakes the tool. This causes undesirable interruptions in the working sequence that are annoying for an operator, and also leads to increased wear of the brake element.

The present invention now makes provision to mount the anchor via a pivot joint on the anchor pin so as to be pivotable about at least one pivot axis. As a result, the anchor can pivot in relation to the anchor pin. An inclination of the anchor pin, brought about by a relative movement between electromagnet and actuating element, does not inevitably cause an inclination of the anchor, because of the pivot joint. Even during a transverse displacement of the electromagnet, the anchor retains its orientation in relation to the electromagnet. A detaching of the anchor from the electromagnet is avoided. It is thereby avoided in a simple manner that the anchor is inclined in relation to the electromagnet and thus reduces the holding forces which the electromagnet exerts on the anchor.

In an advantageous configuration, in the fixed position, in which the brake element does not brake the tool, the anchor lies against a contact plane on the yoke, and at least one pivot axis lies parallel to the contact plane. The pivot axis here is a pivot axis of the pivot joint via which the anchor is mounted pivotably on the anchor pin. As a result, tilting of the anchor pin can be compensated for by an opposite pivoting of the anchor about the pivot axis in relation to the anchor pin, and the orientation of the anchor can be maintained. However, an arrangement of the pivot axis perpendicularly to the contact plane, in particular in the longitudinal direction of the anchor pin, can also be advantageous in order to prevent rotation of the anchor in relation to the yoke of the electromagnet.

The work apparatus is in particular a cutoff machine with a cantilever. In an advantageous manner, the actuating element is mounted on a first region of the cantilever, and the electromagnet is fastened in a second region of the cantilever. The two regions are advantageously at a distance from each other. In particular, the first region is arranged closer to the drive axis of a drive motor and further away from an output axis, which can correspond to the rotational axis of a tool. The second region is advantageously arranged closer to the output axis and further away from the drive axis. The excitation to vibration in the two regions can differ. In this case, in particular the first region, which is arranged further away from the output axis and the rotational axis of the tool and closer to the drive axis, vibrates less strongly than the second region. By means of the differing vibration of the cantilever in the region of the electromagnet and the mounting of the actuating element, a relative movement is brought about between the electromagnet and the actuating element which bears the anchor.

On account of vibrations or the like, the yoke can be displaced in relation to the actuating element in a direction parallel to the contact plane. The displacement is associated with pivoting of the anchor pin by a pivot angle about the pivot axis. It is provided that the pivot angle by which the anchor is tiltable about the pivot axis in relation to the anchor pin is coordinated with the tilting angle by which the anchor pin tilts in relation to the actuating element upon the maximum displacement of the yoke. The pivot angle by which the anchor is pivotable in relation to the anchor pin is advantageously at least as large here as the angle by which the anchor pin is tilted upon the maximum relative displacement of yoke and actuating element with respect to each other. As a result, the maximally caused inclination of the anchor pin during operation can be completely compensated for by pivoting of the pivot joint, and therefore the anchor retains its orientation in relation to the yoke of the electromagnet even when the anchor pin is maximally tilted.

The yoke advantageously has a free space in which those portions of the anchor pin and of the pivot joint which protrude over the contact plane are accommodated. The portions protruding over the contact plane are the portions of anchor pin and/or pivoting joint which protrude onto that side of the contact plane on which the yoke is also arranged. Portions of the anchor pin or pivot joint or portions of the anchor pin and pivot joint can protrude here over the contact plane. The portions of the anchor pin and/or of the pivot joint that protrude over the contact plane are completely accommodated in the free space, in particular for each possible tilting angle of the anchor pin in relation to the actuating element. Those portions of the anchor pin and/or pivot joint which protrude over the contact plane do not come into contact with the yoke in any designated position of the anchor pin because of the free space. As a result, release of the yoke from the anchor by portions of the anchor pin and/or pivot joint that protrude over the end side of the anchor is avoided.

The actuating element is advantageously a pivot lever. At least one pivot axis of the anchor advantageously lies in relation to the anchor pin in a plane which is arranged perpendicularly to the pivot axis of the pivot lever. The relative displacement of yoke and anchor predominantly takes place in the direction of the pivot axis of the pivot lever. Movements in the movement direction of the pivot lever, that is, in the circumferential direction with respect to the pivot axis, can be compensated for by the pivot lever itself. By means of the arrangement of at least one pivot axis in a plane arranged perpendicularly to the pivot axis of the pivot lever, pivoting movements transversely thereto can also be compensated for. At least one pivot axis preferably lies in a plane arranged perpendicularly to the pivot axis of the pivot lever and parallel to the contact element.

The pivot joint advantageously has a curved bearing surface. In a particularly advantageous configuration, the bearing surface is partially spherical. However, a cylindrical bearing surface or a bearing surface curved in some other way may also be advantageous. The ratio of the radius of the bearing surface to the thickness of the anchor is advantageously from 0.3 to 2. Accordingly, the diameter of the bearing surface is advantageously at least as large as the thickness of the anchor and, in a preferred configuration, is greater. In a particularly advantageous configuration, the radius of the bearing surface to the thickness of the anchor is 0.4 to 1, in particular 0.4 to 0.8. This results in a comparatively large area of the bearing surface and in a simple configuration. The diameter of the bearing surface is advantageously greater than the diameter of the anchor pin, in particular greater than the diameter of an opening in the anchor, through which the anchor pin protrudes. As a result, the bearing surface can be formed directly on the anchor in a region which lies radially outside the opening through which the bearing pin protrudes, thus resulting in a simple, compact configuration. The associated bearing surface of the anchor runs in particular in an arched or conical manner.

A compact configuration is also achieved if the pivot axis of the anchor lies on that side of the anchor which faces the yoke. The distance of the pivot axis from the contact plane is advantageously small. The distance of the pivot axis from the contact plane is advantageously smaller than the radius of the bearing surface. As a result, the pivot joint advantageously partially enters the anchor. The pivot joint has a curved shape in particular only on its side facing the anchor. The extent of the pivot joint that protrudes out of the anchor over the contact plane can thereby be kept small. The pivot joint advantageously only slightly enters the anchor and the thickness of the anchor is not reduced or only slightly reduced by the pivot joint, with the overall size being unchanged. This only slightly interferes with the magnetic flux.

The anchor pin advantageously protrudes through the anchor and through a fastening section of the actuating element. The anchor pin is advantageously pivotable in relation to the actuating element. The inclination of the anchor brought about by tilting of the anchor pin in relation to the actuating element is advantageously at least partially, in particular completely, compensated for by the pivot joint between anchor and anchor pin.

It is a further object of the invention, in the case of a cutoff machine with a cantilever on which the yoke is fixed, to limit the relative movements between the yoke and the anchor.

This object is achieved by a handheld work apparatus, with a tool and with a brake assembly for the tool, the brake assembly having an actuating element which acts on a brake element of the brake assembly, the actuating element being movable between a fixed position, in which the brake element does not brake the tool, and a released position, in which the brake element brakes the tool, the brake assembly having an electromagnet for fixing the actuating element in the fixed position, the electromagnet comprising a yoke and a coil, and the electromagnet interacting with an anchor, the anchor being held on the actuating element by an anchor pin, the work apparatus being a cutoff machine which has a cantilever on which a cutting disc forming the tool is mounted rotatably about a rotational axis, the cantilever having a longitudinal direction in which the greatest extent of the cantilever lies perpendicular to the rotational axis, and the cantilever having a transverse direction running parallel to the rotational axis and a vertical direction running perpendicularly to the transverse direction and perpendicularly to the longitudinal direction, the yoke being fixed to the cantilever, a guide being provided which comprises a first guide part connected to the anchor and a second guide part connected to the yoke, the first guide part and the second guide part interacting in a fixed position of the actuating element and guiding the anchor relative to the yoke in the transverse direction of the cantilever.

In order to limit the relative movements in the transverse direction of the cantilever, a guide is provided which comprises a first guide part connected to the anchor and a second guide part connected to the yoke. In the fixed position of the actuating element, the first guide part and the second guide part interact and guide the anchor relative to the yoke in the transverse direction of the cantilever. This makes it possible in a simple manner to limit the relative movements of the yoke and of the anchor with respect to each other in the transverse direction of the cantilever. This invention is independent of the configuration of a pivot joint via which the anchor is mounted pivotably in relation to the anchor pin, and relates to an inventive concept which is independent thereof. The transverse direction of the cantilever here is advantageously a direction parallel to a drive axis or an output axis of a belt drive arranged in the cantilever. The transverse direction is advantageously the direction which lies parallel to the rotational axis of the tool. The extent of the cantilever in the transverse direction is customarily small. The cantilever therefore has a tendency to vibrate in particular in the transverse direction. The cantilever in particular has a significantly smaller extent in the transverse direction than in the longitudinal direction.

Positioning of anchor and yoke with respect to each other can take place in a simple manner via the guide. In the event of vibrations of the cantilever in the transverse direction, the actuating element can be carried along via the guide and can be moved at the same time, in particular because of its inherent elasticity. Provision can be made to take measures for reducing the wear of one or both guide parts. This makes it possible to ensure that, in the event of vibrations during operation, only slight wear, if any at all, occurs at the guide parts.

A simple configuration arises if one of the guide parts is a lug and the other guide part has an opening, wherein the lug protrudes into the opening in the fixed position of the actuating element. The opening is preferably configured as an elongated hole. It is advantageously provided, in the fixed position of the actuating element, that there is play in the transverse direction of the cantilever. The play in the transverse direction of the cantilever is advantageously selected in such a manner that relative movements because of the play in the transverse direction can be completely compensated for by a pivot joint between anchor and anchor pin. There is advantageously also play between the lug and the edge of the opening in the longitudinal direction of the cantilever. This is advantageous in particular whenever the actuating element is configured as a pivot lever and the movement of the lug into the opening is made possible via the play in the longitudinal direction of the cantilever.

The guide parts advantageously do not interact over the entire actuating distance. The guide parts interact at least in the fixed position of the actuating element and are in engagement with each other. Detaching of the anchor, which is arranged on the actuating element and is magnetically connected to the electromagnet, due to transverse vibrations of the electromagnet is reliably avoided by the guide parts being in engagement with each other. In an advantageous configuration, in the released position of the actuating element, the guide parts are arranged at a distance from each other. In the released position of the actuating element, that is when anchor and electromagnet are not magnetically connected, the relative position of anchor and electromagnet is of secondary importance, and therefore, in this position, an interaction of the guide parts and a positioning of anchor and yoke with respect to each other in the transverse direction can be dispensed with. The guide parts preferably interact only after crossing at least half the adjustment distance from the released position to the fixed position and guide the anchor in relation to the yoke. As a result, the lug can be configured to be comparatively short, and a simple configuration is produced. The adjustment distance is the distance which one of the guide parts covers in relation to the other guide part during the adjustment from the released to the fixed position.

At least one of the guide parts advantageously has an insertion chamfer. This makes it possible to ensure in a simple manner that, during the adjustment of the actuating element into the fixed position, the guide parts meet in order to form the guide, even if the guide parts are arranged at a distance from each other in the released position of the actuating element. In a simple configuration, the insertion chamfer is formed on the lug of the guide. This makes it possible to provide a comparatively large insertion chamfer in a simple manner. The insertion chamfer is preferably configured as a conical portion of the lug. The width of the insertion chamfer advantageously corresponds at least to the distance by which the guide parts move relative to each other in the transverse direction.

The actuating element is in particular a pivot lever, and the distance of the pivot axis of the pivot lever from the fastening point of the electromagnet to the cantilever is at least 5 cm. In a preferred configuration, the distance is at least 8 cm. In particular, at a comparatively large distance between pivot axis and fastening point of the electromagnet, the guidance between the actuating element and the electromagnet is advantageous since, because of the comparatively large length of the pivot lever, large relative movements of the cantilever in relation to the free end of the pivot lever may arise.

The brake assembly advantageously has a knee lever arrangement which comprises a first lever and a second lever. The first lever is mounted pivotably about a first pivot axis in relation to the actuating element, and the second lever is mounted on the first lever so as to be pivotable about a second pivot axis. The second lever is mounted on a third pivot axis on a third lever, wherein the third lever acts on the brake element. In order to achieve triggering of the brake assembly with low actuating forces, it is provided that the knee lever arrangement is not in the over-pressed position either in the released position or in the fixed position. For this purpose, it is provided that the first pivot axis and the third pivot axis lie in a rocker arm plane, and the second pivot axis is arranged on the same side of the rocker arm plane in the released position and in the fixed position. Over-pressing of the second pivot axis beyond the dead center is thereby unnecessary, and therefore a triggering spring which pretensions the brake assembly can be configured to be comparatively weak.

For the pivot joint, it is advantageously provided that the pivot joint is composed of a dimensionally stable material. The pivot joint is in particular not configured as a damping element.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
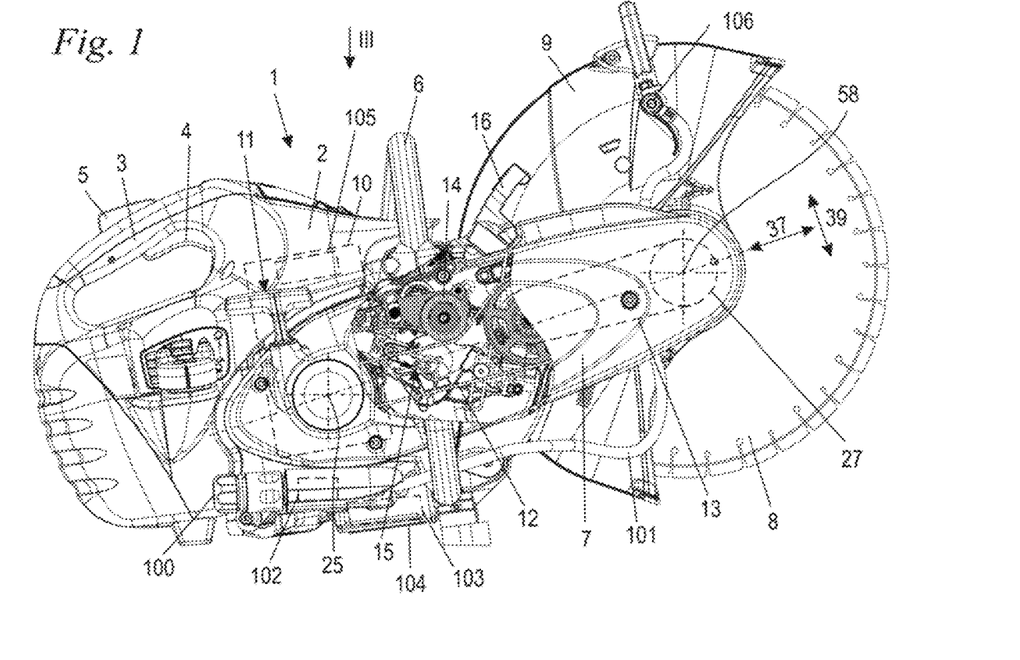
FIG. 1 shows a partially sectioned side view of a cutoff machine, wherein the intersecting plane lies in the cantilever.

FIG. 1 shows a cutoff machine 1 as an embodiment of a handheld work apparatus. The cutoff machine 1 has a housing 2 on which a handle 3 and a bale handle 6 for guiding the cutoff machine 1 during operation are secured. A throttle lever 4 and a throttle lever lock 5 for operating a drive motor 10 arranged in the housing 2 are provided on the handle 3 which, in the embodiment, is arranged on the upper side of the housing 2. The handle 3 can also be configured as a rear handle. The drive motor 10 is preferably a combustion engine, especially a single-cylinder two-stroke engine. A starter device 11, in the embodiment, shown a pull rope starter, is provided for starting the drive motor 1. It can also be provided that the drive motor 10 is an electric motor which is supplied with energy preferably via a battery.

The cutoff machine 1 has an outrigger or cantilever 7 which, in the embodiment, is fixed on the housing 2. At the free end of the cantilever 7, a cutting disc 8 is mounted in a manner rotating about a rotational axis 58. The cutting disc 8 is the tool of the cutoff machine 1 and is driven by the drive motor 10 via a belt drive. A different drive of the cutting disc 8 may also be advantageous. In the embodiment, the belt drive is configured as a two-stage belt drive and comprises a first drive belt 12 and a second drive belt 13. Tension pulleys 14, of which one is shown in FIG. 1, are provided for tensioning the drive belts 12 and 13. The belt drive is configured as a reduction gearing, and therefore the rotational speed of the cutting disc 8 is lower than that of the drive motor 10.

The cutting disc 8 is covered over part of its circumference by a protective cover 9. During operation, when the cutting disc 8 is used for cutting stone, a large amount of dust arises. For the binding of the dust and for the cooling of the cutting disc 8, a liquid supply, in particular a water supply, is provided. The liquid supply comprises a liquid connection 100 for connection to an external supply of liquid. The liquid connection 100 is connected via a liquid line 101 to at least one feed valve 106 on the protective cover 9. In order to control the supplied quantity of liquid, a valve 102 which is electrically controlled is provided. The quantity of liquid which is desired by the operator and is to be supplied can be set via a panel for operator control (FIG. 3) on the upper side of the housing 2.

A control unit 103 is provided which correspondingly activates the valve 102. In the embodiment, the control unit 103 is arranged on the lower side of the housing 2. In the embodiment, the control unit 103 is not arranged in the housing 2 but rather outside the housing 2 and is downwardly covered by a separate cover 104. The control unit 103 is advantageously cast, and therefore, by means of the casting and the cover 104, a double protection against dirt or liquid is provided.

The cover 104 is advantageously fixed on the housing 2 via snap-type connections and/or screw connections. The control unit 103 advantageously lies at a distance in the cover 104. A defined distance between control unit 103 and cover 104 can be achieved, for example, via ribs between the control unit 103 and the cover 104. In a preferred configuration, the cover 104 has at least one drain opening on its lower side, which is arranged at the bottom during customary operation, and therefore moisture or dirt can emerge out of the cover 104. It may be advantageous to support the control unit 103 in relation to the cover 104 via at least one damping element.

In order to control the drive motor 10, an ignition module 105 is advantageously provided which is formed separately from the control unit 103 and is arranged on the drive motor 10 itself in particular in the upper region of the housing 2. A different arrangement of the ignition module 105 or a further control unit for activating the drive motor 10 can also be advantageous.

The cutoff machine 1 has a brake assembly 15. A rotation rate sensor is advantageously provided for triggering the brake assembly 15. In the embodiment, it is provided that the rotation rate sensor is likewise arranged in the control unit 103. The rotation rate sensor is advantageously oriented here with respect to the rotational axis 58 of the cutting disc 8. A measurement axis of the rotation rate sensor preferably lies parallel to the rotational axis 58.

Figure 2:
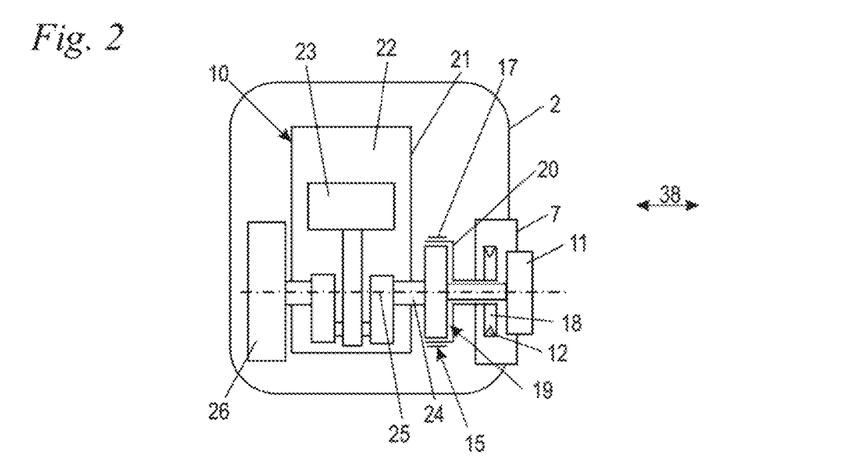
FIG. 2 shows a schematic sectional view through the drive of the cutoff machine of FIG. 1.

The cantilever 7 has a longitudinal direction 37 which, in the embodiment, forms the straight connecting line of the drive axis and of the output axis of the belt drive in a side view in the direction of the drive axis. In the embodiment, the drive axis coincides with a rotational axis 25 of a crankshaft 24 (FIG. 2) of the drive motor 10, and the output axis is the rotational axis 58 of the cutting disc 8. In the longitudinal direction 37, the greatest extent of the cantilever 7 lies perpendicularly to the rotational axis 58. The cantilever 7 has a vertical direction 39 which is oriented perpendicularly to the longitudinal direction 37 and perpendicularly to the rotational axes 25 and 58. In addition, the cantilever 7 has a transverse direction 38 which, in FIG. 1, is oriented perpendicularly to the plane of the sheet and is shown in FIG. 2. The transverse direction 38 extends perpendicularly to the longitudinal direction 37 and perpendicularly to the vertical direction 39.

FIG. 2 shows the configuration of the drive of the cutoff machine 1 in detail. The drive motor 10 has a cylinder 21 in which a combustion chamber 22 is formed. The combustion chamber 22 is bounded by a piston 23 which drives the crankshaft 24 in a rotational manner about the rotational axis 25. A fan wheel 26 for conveying cooling air is arranged on one side of the drive motor 10. In the embodiment, a centrifugal clutch 19, via which the crankshaft 24 is to be connected to a drive disc 18 of the belt drive, is arranged on the opposite side. The centrifugal clutch 19 has a clutch drum 20, on the outer circumference of which a brake band 17 of the brake assembly 15 is arranged. The brake assembly 15 acts on the clutch drum 20 of the centrifugal clutch 19, that is, on the output side of the centrifugal clutch 19. The starter device 11 is arranged on the outer side of the cantilever 7.

As FIG. 1 shows, an actuating lever 16 which serves for releasing the brake assembly 15, as is described in more detail below, is arranged on the upper side of the cantilever 7.

Figure 3:
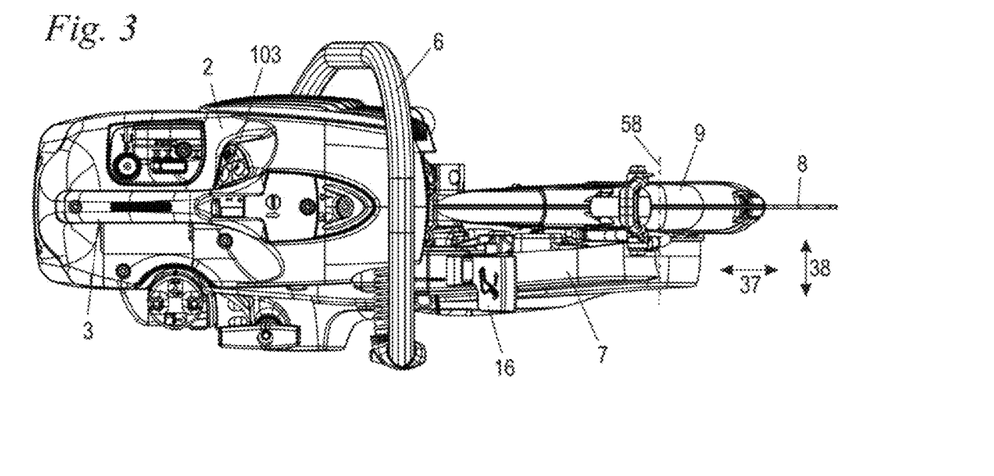
FIG. 3 shows a top plan view of the cutoff machine of FIG. 1 in the direction of the arrow III in FIG. 1.

The arrangement of the actuating lever 16 is also shown in FIG. 3. FIG. 3 also shows the orientation of the transverse direction 38 perpendicularly to the longitudinal direction 37.

Figure 4:
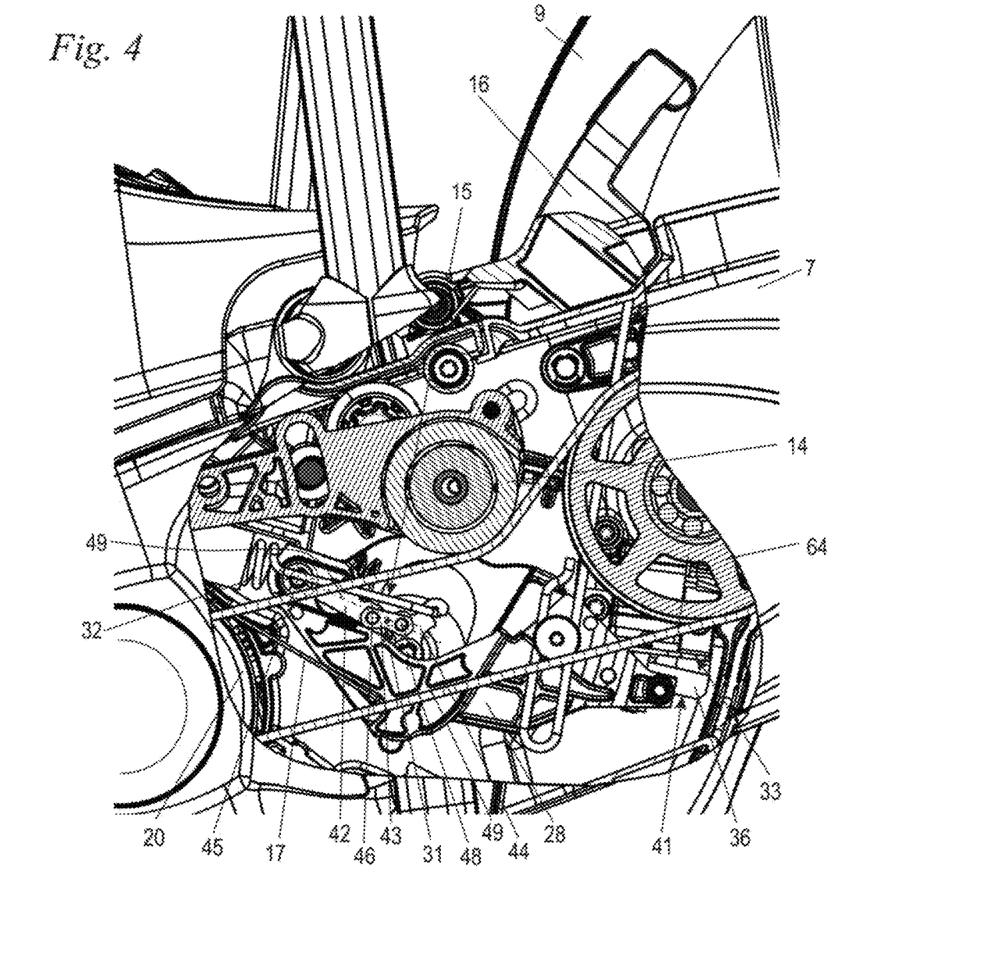
FIG. 4 is an enlarged view of the region, shown in section, of the cantilever of the cutoff machine of FIG. 1.

FIG. 4 shows the configuration of the brake assembly 15 in more detail. The brake assembly 15 has a pivot lever 28. The pivot lever 28 forms the actuating element of the brake assembly 15. FIG. 4 shows the pivot lever 28 in a fixed position 41. The brake assembly 15 comprises an electromagnet 33 which is fixed on the cantilever 7. An anchor 36 is arranged on the pivot lever 28 adjacent to the free end of the pivot lever 28, the anchor, in the fixed position 41, lying against the electromagnet 33 and being fixed on the electromagnet 33 by means of the magnetic force. The pivot lever 28 is held in the fixed position 41 by the electromagnet 33. In the fixed position 41, the brake band 17 is released and does not lie fixedly against the circumference of the clutch drum 20. As a result, the centrifugal clutch 19 (FIG. 2) can engage when the drive motor 10 is running, and can drive the cutoff disc 8 via the belt drive (FIG. 1).

The brake assembly 15 has a knee lever arrangement 31 which acts on the brake band 17. During the pivoting of the pivot lever 28 from the fixed position 41, shown in FIG. 4, into the released position 40, shown in FIG. 5, the knee lever arrangement 31 serves to pull the brake band 17 about the clutch drum 20 and thereby to brake the cutting disc 8. As FIG. 4 shows, the knee lever arrangement 31 comprises a lever 44 which is held on the pivot lever 28 so as to be pivotable about a pivot axis 48. A trigger spring 32 is hooked at one end on the lever 44. The brake band 17 is hooked at one end on a second end of the lever 44, which end is concealed in FIG. 4 by the pivot lever 28. The second end of the brake band 17 is fixed in a manner mounted on the housing. In order to tighten the brake band 17 about the clutch drum 20, the lever 44 has to pivot about the pivot axis 48 in the counterclockwise direction in FIG. 4. A lever 43 is mounted on the lever 44, between the pivot axis 48 and the hook-in point of the trigger spring 32, so as to be pivotable about a pivot axis 47. At the second end of the lever 43, a lever 42 is mounted pivotably about a pivot axis 46. The lever 42 is mounted at its other end so as to be pivotable about a pivot axis 45. In the embodiment, the pivot axis 45 is the pivot axis about which the pivot lever 28 is mounted pivotably in relation to the cantilever 7. However, it can also be provided that the lever 42 is mounted pivotably in relation to the pivot lever 28 about a pivot axis which is spaced apart from the pivot axis 45. The pivot axes 45, 46, 47 and 48 lie parallel to one another. The pivot axes 45 and 47 define a rocker arm plane 49. The pivot axis 46 which forms the knee lever joint lies between the pivot axes 45 and 47. In the fixed position 41, the pivot axis 46 is at a small distance from the rocker arm plane 49. An intermediate disc 64 of the belt drive, about which the first drive belt 12 is guided, can also be seen in FIG. 4.

In order to actuate the brake assembly 15, the electromagnet 33 is switched off. As a result, the anchor 36 is released from the electromagnet 33, and the pivot lever 28 pivots into the released position 40 shown in FIGS. 5 and 6. In the fixed position 41, the knee lever arrangement 31 is pretensioned, as FIG. 4 shows. Owing to the fact that the pivot axis 46, at which the levers 42 and 43 are connected to each other, and the hook-in point of the trigger spring 32 on the lever 44 lie on opposite sides of the knee lever plane 49, the force of the trigger spring 32 acts in the direction of adjusting the knee lever arrangement 31 toward the released position 40. The electromagnet 33 opposes the force in the fixed position 41. In the fixed position 41, the transmission angle of the spring force to the knee lever is reduced because of the virtually extended knee lever joint, which is formed at the axis 46, in such a manner that the magnetic force of the electromagnet 33 suffices in order to hold the pivot lever 28 in the kinematically unstable fixed position 41 counter to the effective spring tensioning of the trigger spring 32.

If the electromagnet 33 is switched off, the trigger spring 32 adjusts the lever 44. The lever 44 slides along an actuating contour 65 (shown schematically in FIG. 6) of the pivot lever 28. Owing to the orientation of the actuating contour 65, the pivot lever 28 pivots about the pivot axis 45 into the released position 40 shown in FIGS. 5 and 6. The pivot axis 46 is further away here from the knee lever plane 49. The knee lever joint buckles, and the trigger spring 32 can pivot the lever 44, as a result of which the brake band 17 is tensioned. Also in the released position 40, the pivot axis 46 and the hook-in point of the trigger spring 32 on the lever 44 lie on opposite sides of the knee lever plane 49. In the embodiment, the pivot axis 46 is always on one side, in the illustration in FIG. 4 below, the knee lever plane 49 irrespective of the position of the brake assembly 15. As a result, the knee lever arrangement 31 does not act in a self-locking manner, that is, the knee lever joint is never over-pressed onto the opposite side of the knee lever plane 49. A resetting spring which unblocks the knee lever arrangement 31 is not required. In the fixed position 41 of the pivot lever 28, the knee lever arrangement 31 is held in its unstable position exclusively by the electromagnet 33.

Figure 5:
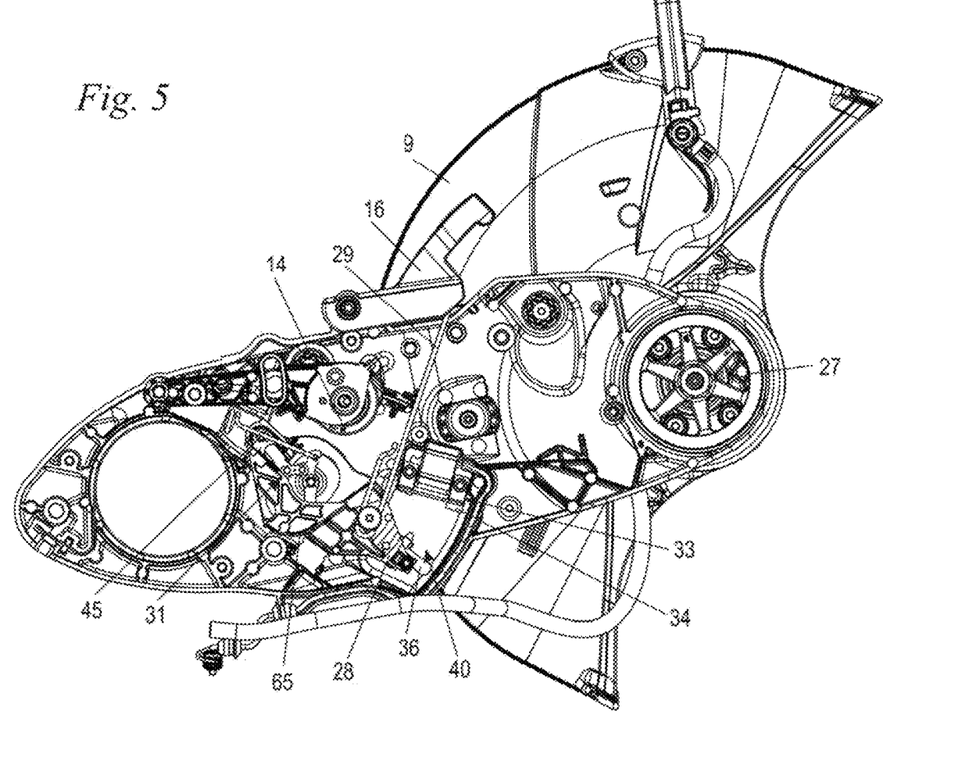
FIG. 5 is a side view of the cantilever and of the protective cover, wherein some components of the cantilever are not shown.

The output disc 27 of the belt drive is also shown in FIG. 5.

Figure 6:
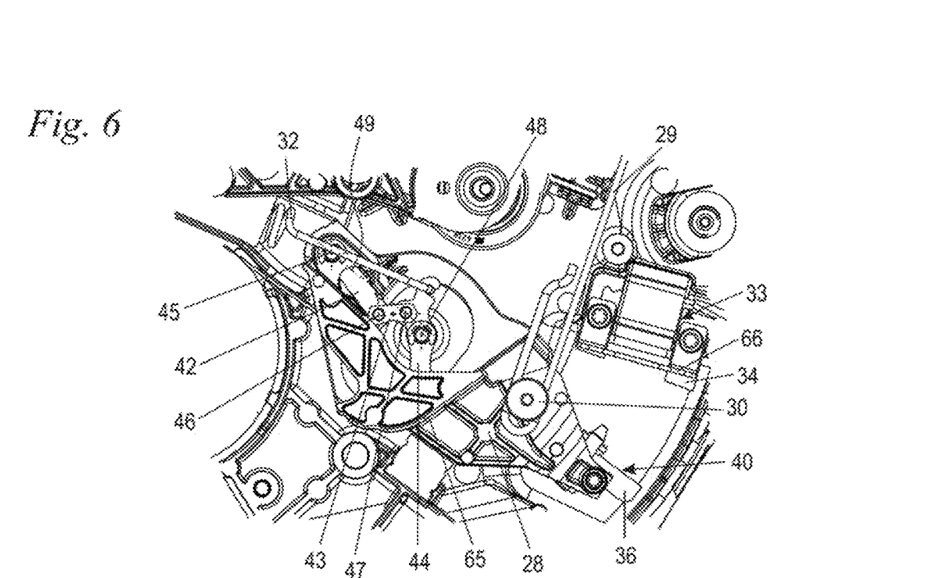
FIG. 6 is a partially enlarged view of the region of the pivot lever from FIG. 5 with the pivot lever in the released position.

In order to adjust the brake assembly 15 from the released position 40 of the pivot lever 28, that is shown in FIGS. 5 and 6 and in which the brake band 17 is tightened about the clutch drum 20, into the fixed position 41, which is shown in FIG. 4 and in which the brake does not act on the clutch drum 20, the operator pivots the actuating lever 16 upward. An actuating rod 29, which is also shown in FIG. 6, is hooked in on the actuating lever 16 (FIG. 5). The actuating rod 29 is hooked in on a guide pin 30 of the pivot lever 28 and pivots the pivot lever 28 into the fixed position 41. The actuating rod 29 is hooked in on the guide pin 30 with an elongated hole, and therefore the actuating lever 16 can be moved in relation to the pivot lever 28 and set back into its starting position without the brake assembly 15 being set back into the released position 40 of the pivot lever 28.

During operation, the cantilever 7 is excited into vibrations because of the vibrations generated by the drive motor 10, in particular a combustion engine, and/or because of vibrations which are caused by the engagement of the cutting disc 8 in a workpiece. Owing to its configuration, the cantilever 7 in particular vibrates in the transverse direction 38. In the embodiment, the extent of the cantilever 7 in the transverse direction 38 is smaller than the extent in other spatial directions, in particular smaller than the extent in the longitudinal direction 37. By means of the relatively small spatial extent of the cantilever 7 in the transverse direction 38 in relation to its extent in other spatial directions, the cantilever 7 has a tendency in particular to vibrate in the transverse direction 38. Owing to the fact that the anchor 36 and the electromagnet 33 are fixed on the cantilever 7 at a distance from each other in the longitudinal direction 37 of the cantilever 7, anchor 36 and electromagnet 33 vibrate to differing degrees. In the embodiment, the electromagnet 33 vibrates with a greater amplitude than the anchor 36. This relative movement in the transverse direction 38 brings about a tilting of the anchor 36 in relation to a yoke 34 of the electromagnet 33 as soon as the anchor 36 can no longer follow the movement of the yoke 34. By means of the tilting, the holding forces of the electromagnet 33 can become too small to hold the pivot lever 28 in the fixed position 41. In order to limit the relative movement, a guide 60 is provided. The guide 60 is shown in detail in FIGS. 7 and 8. The guide 60 comprises a lug 61 which protrudes through an opening 62 of a guide plate 66. In the embodiment, the guide plate 66 is of L-shaped configuration and is fixed on the electromagnet 33. The opening 62 and the lug 61 limit the relative movement of the electromagnet 33 in relation to the anchor 36 in the transverse direction 38.

Figure 7:
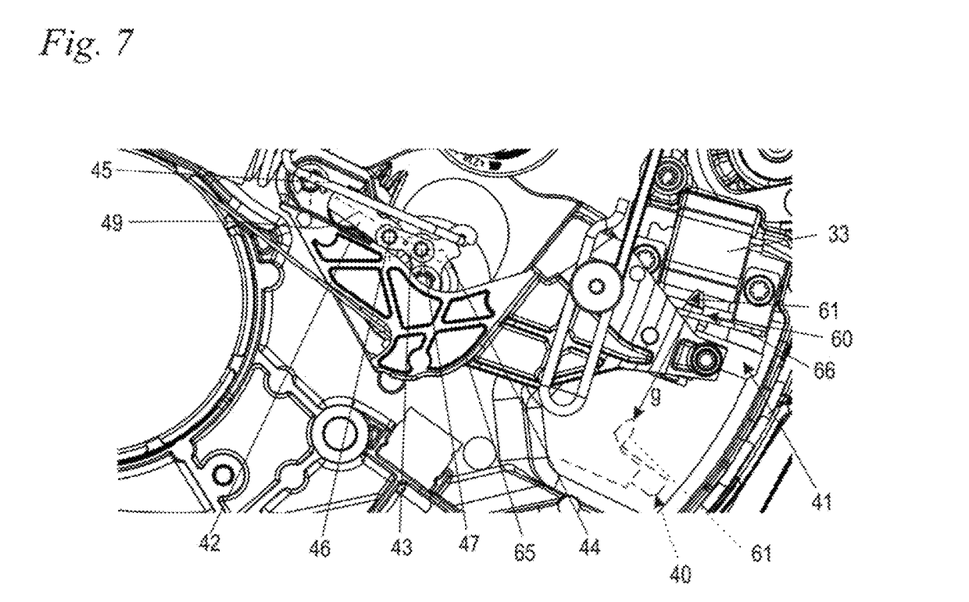
FIG. 7 shows the region from FIG. 6 with the pivot lever in the fixed position.
Figure 8:
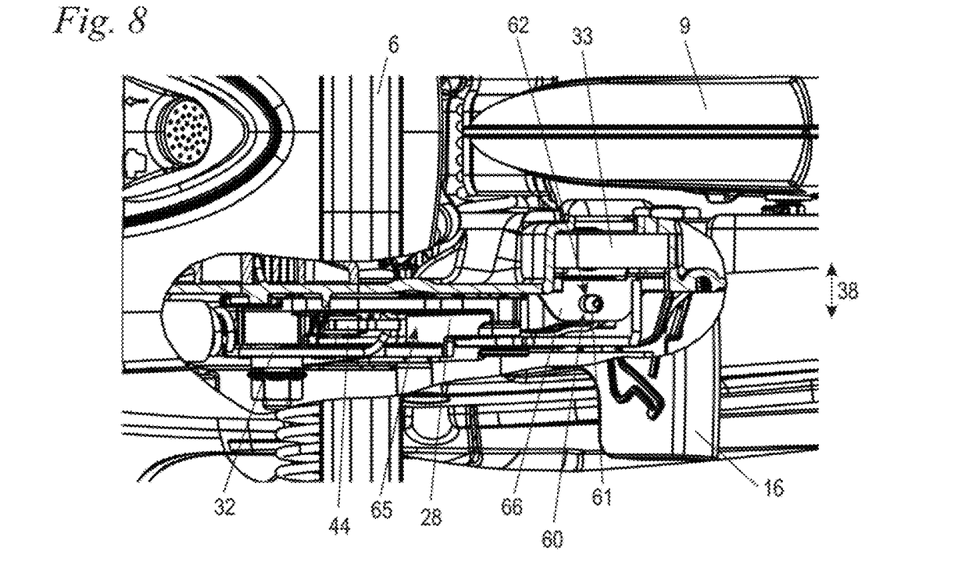
FIG. 8 shows a partially sectioned top plan view of the cutoff machine.

FIG. 7 shows the position of the lug 61 in the released position 40 by a dashed line. As FIG. 7 shows, the lug 61 is adjusted by an adjustment distance g between the released position 40 and the fixed position 41. As FIG. 7 also shows, during the adjustment from the released position 40 into the fixed position 41, the lug 61 comes into the region of the opening 62 only toward the end of the pivoting distance g (FIG. 8). The lug 61 covers at least half of the pivoting distance g before entering the region of the guide plate 66. The lug 61 and the opening 62 form guide parts of the guide 60. A different configuration of guide parts can also be provided. The actuating contour 65 of the knee lever arrangement 31 is also shown in FIG. 8.

Figure 9:
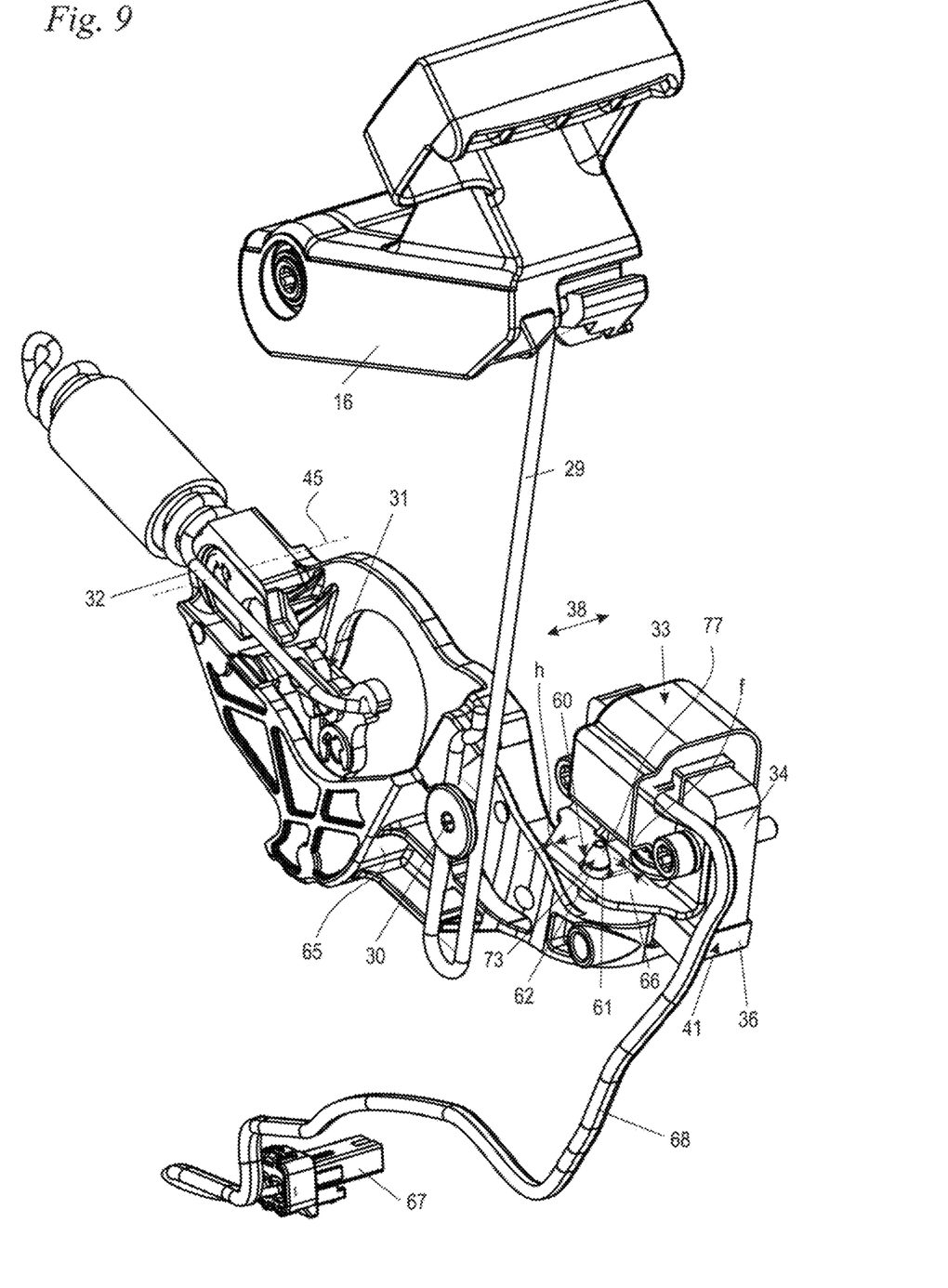
FIG. 9 and FIG. 10 show perspective views of the pivot lever and of the components interacting with the pivot lever.

FIG. 9 shows the configuration of the guide 60 in detail. FIG. 9 shows the arrangement of electromagnet 33, pivot lever 28 and actuating lever 16 in a fixed position 41 of the pivot lever 28. The anchor 36 lies against the yoke 34 of the electromagnet 33 and is held by the latter. The lug 61 protrudes into the opening 62. The lug 61 has play h here in the transverse direction 38. The play h is comparatively small here. The opening 62 is configured as an elongated hole, wherein the opening 62 has its smallest radial extent in the transverse direction 38. The opening 62 has a significantly greater play f in relation to the lug 61 perpendicularly to the pivot axis 45 of the pivot lever 28. The play f is likewise shown schematically in FIG. 9. The play h in the transverse direction 38 is advantageously 0.05 mm to 0.7 mm, in particular up to 0.5 mm. A play h in the transverse direction 38 of 0.1 mm to 0.4 mm has proven particularly advantageous. The play f in the longitudinal direction 37 is advantageously at least 1 mm, in particular at least 2 mm, and is coordinated with the length of the lug 61 and the distance of the lug 61 from the pivot axis 45.

As FIG. 9 also shows, the lug 61 is provided with an insertion chamfer 77 in the form of a conical section 73. The cone here is of comparatively large configuration and extends over more than half of the diameter of the lug 61. This ensures that, even at a lateral distance between the center of the lug 61 and the center of the opening 62, the lug 61 enters the opening 62 and is substantially centered in the opening 62. It can be provided to provide measures on the lug 61 and/or at the openings 62 in order to reduce wear due to vibrations occurring during operation. For this purpose, in particular the lug 61 can be hardened and/or the guide plate 66 can be realized with an increased thickness at least in the region of the opening 62. As FIG. 9 also shows, the electromagnet 33 is connected via an electrical line 68 to a connector plug 67 for connection to a control unit. The control unit is preferably the control unit 103 which also has the rotational rate sensor, and therefore the electromagnet 33 can be released if the rotation rate of the cutoff machine 1 exceeds a predetermined value.

Figure 10:
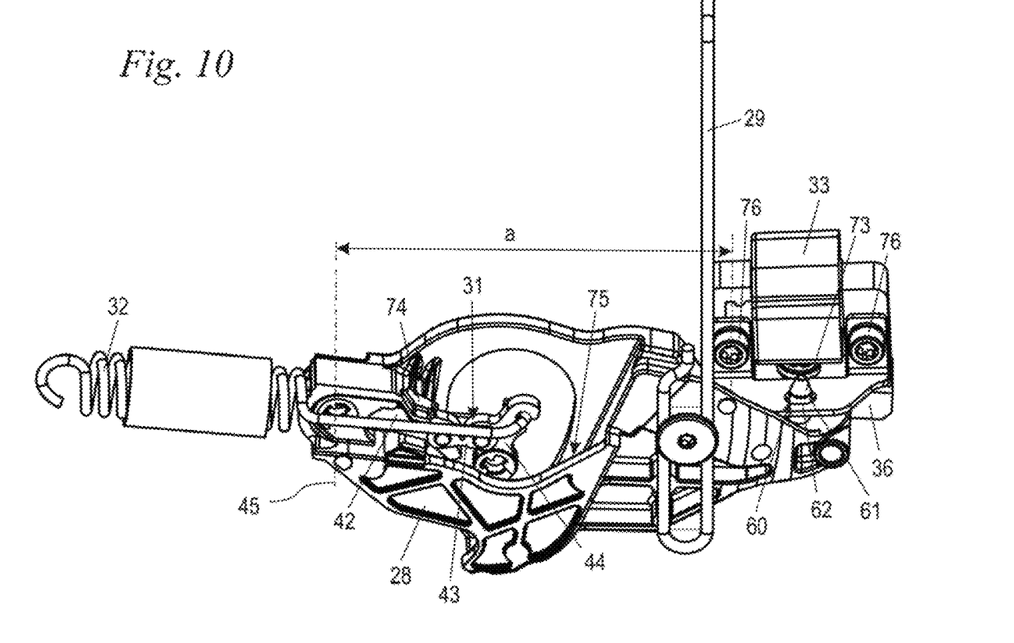

As FIG. 10 shows, the pivot axis 45 of the pivot lever 28 has a distance a from the fastening point of the electromagnet 33 to the cantilever 7. In the embodiment, the electromagnet 33 is secured on the cantilever 7 with two fastening screws 76. The distance a here is measured as far as a fastening screw 76 lying closest to the pivot axis 45, namely as far as the central axis of the fastening screw. The distance a is advantageously greater than 5 cm, in particular greater than 8 cm. Under certain operating conditions, transverse vibrations can occur at the cantilever 7 and, at a distance of at least 5 cm, lead to such a relative movement of the electromagnet 33 in relation to the free end of the pivot lever 28 that the anchor 36 (FIG. 11) can be unintentionally released from the yoke 34 of the electromagnet 33. The configuration of the knee lever arrangement 31 is also visible in FIG. 10. The lever 44 is partially arranged in a pocket 75 of the pivot lever 28, on the circumferential wall of which pocket the actuating contour 65 (FIG. 9) is formed.

Figure 11:
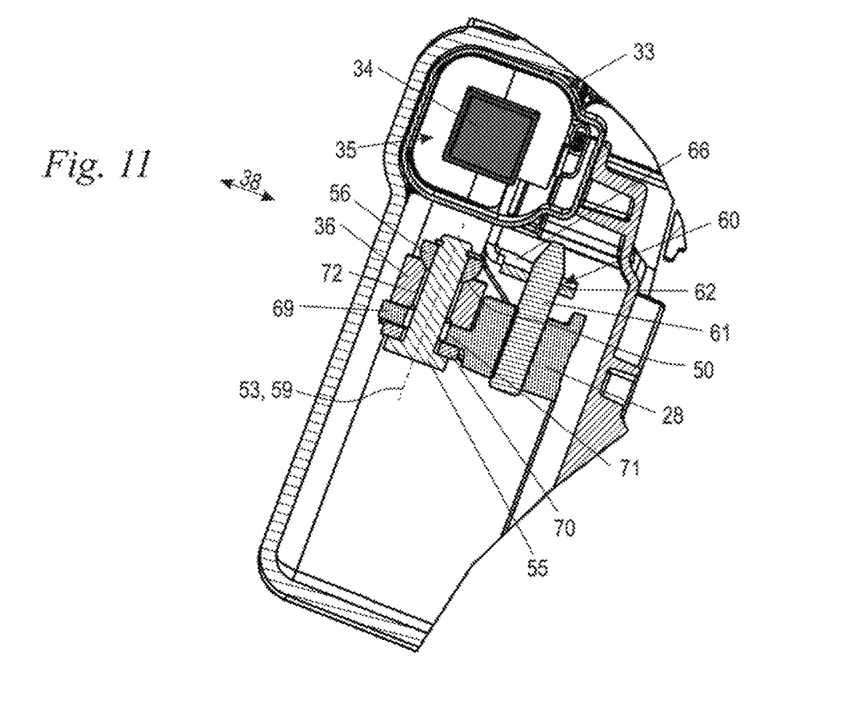
FIG. 11 is a section through the electromagnet and the pivot lever in the transverse direction of the cutoff machine.

FIG. 11 shows the fixing of the anchor 36 on the pivot lever 28. The anchor 36 is fixed on a fastening section 69 of the pivot lever 28 via an anchor pin 55. In the embodiment, the lug 61 is also arranged on the fastening section 69. The lug 61 and the anchor pin 55 are arranged in the same cross section, that is, next to each other with respect to the transverse direction 38. The anchor pin 55 protrudes through the fastening section 69 of the pivot lever 28 and the anchor 36. A pivot joint 50, via which the anchor 36 is mounted pivotably in relation to the anchor pin 55, is formed on that side of the anchor 36 which faces away from the fastening section 69. In the embodiment, the pivot joint 50 has a partial ball section 56 which is fixed on the anchor pin 55. In the embodiment, the anchor pin 55 protrudes through the partial ball section 56. The partial ball section 56 is formed in the embodiment by a hemisphere which has a central opening for receiving the anchor pin 55. The partial ball section 56 lies against the anchor 36 on that side of the anchor 36 which lies opposite the fastening section 69. The anchor pin 55 protrudes through an opening 71 of the fastening section 69 and through an opening 72 of the anchor 36. In the embodiment, a depression in which the partial ball section 56 is mounted is formed on the region surrounding the opening 72 on that side of the anchor 36 which faces away from the fastening section 69.

A damping element 70, for example a foam or rubber element, through which the anchor pin 55 likewise protrudes is arranged on that side of the fastening section 69 which faces away from the anchor 36. The damping element 70 damps the impact force when an operator actuates the operator controlled lever 16 and subsequently abruptly lets the latter go. In the embodiment, the head of the anchor pin 55 lies against the damping element 70. The opening 62 of the guide 60 is also shown in FIG. 11. As FIG. 11 also shows, the electromagnet 33 has a coil 35 which is shown schematically in FIG. 11 by the construction space taking in the coil 35.

Figure 12:
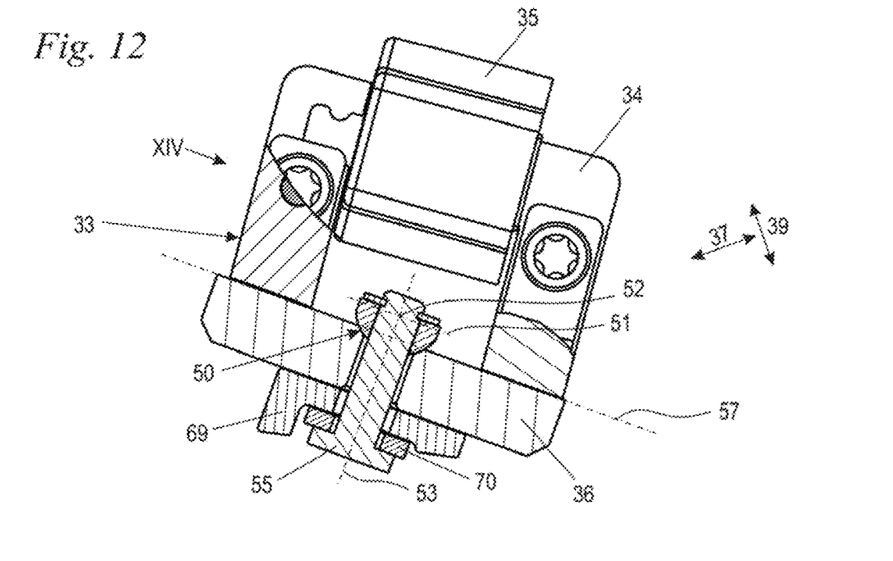
FIG. 12 is a partially sectioned view of the electromagnet, the anchor and the pivot lever.

As FIG. 12 shows, the anchor 36 lies against a contact plane 57 on the end sides of the yoke 34. In the embodiment, the electromagnet 33 is configured with a U-shaped yoke and a flat anchor. However, provision can also be made for the anchor to be configured as a plunger-type anchor and to enter the yoke of the coil. The constructional form of the electromagnet 33 is independent of the present invention. The pivot joint 50 permits movements of the anchor 36 about pivot axes 51, 52 and 53 in relation to the anchor pin 55. The pivot axis 53 is the longitudinal center axis of the anchor pin 55. The pivot axis 51 and the pivot axis 52 are oriented parallel to the contact plane 57 while the pivot axis 53 is perpendicular to the contact plane 57. The pivot axis 52 is oriented here parallel to the transverse direction 38 and, in FIG. 12, lies perpendicularly to the plane of the sheet. The pivot axis 51 is oriented perpendicularly to the pivot axes 52 and 53 and lies in a plane defined by the longitudinal direction 37 and the vertical direction 39 of the cantilever 7. As FIG. 11 shows, the cantilever 7 has a plane 59 which runs perpendicularly to the transverse direction 38 and therefore perpendicularly to the pivot axis 45 of the pivot lever 28. The pivot axes 51 and 53 lie in the plane 59 which corresponds to the sectional plane in FIG. 12.

Portions of the anchor pin 55 and of the pivot joint 50 protrude over the contact plane 57 on that side of the contact plane 57 on which the yoke 34 is also arranged. The portions are completely accommodated in a free space 80 of the yoke 34 for all designated tilting angles of the anchor pin 55. In the embodiment, the yoke 34 is of U-shaped configuration, and the free space 80 is formed between the two limbs of the U. In the embodiment, the portions protruding over the contact plane 57 comprise a portion of the anchor pin 55, a portion of the partial ball section 56 and a securing element 81 with which the partial ball section 56 is held on the anchor pin 55.

Figure 13:
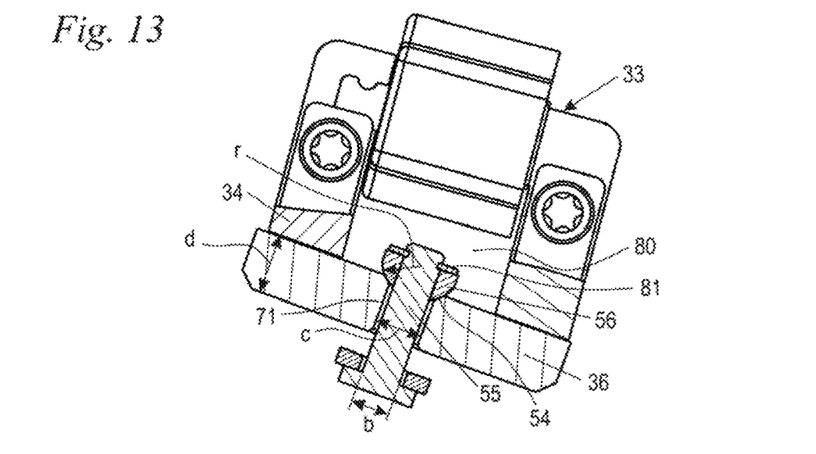
FIG. 13 is a partially sectioned view corresponding to FIG. 12 through the electromagnet, the anchor and the anchor pin.

As FIG. 13 shows, the opening 71 in the anchor 36 has a diameter c which is larger than a diameter b of the anchor pin 55. The diameter b is measured here in that region of the anchor pin 55 which is arranged in the opening 71. The diameter c can be, for example, approximately 1 mm to 1.5 mm larger than the diameter b. The anchor 36 has a thickness d measured perpendicularly to the contact plane 57. The partial ball section 56 has a bearing surface 54 at which the partial ball section 56 lies against the anchor 36 and, together with the latter, forms the pivot joint 50. The bearing surface 54 has a radius r. The ratio of the radius r of the bearing surface 54 to the thickness d of the anchor 36 is advantageously from 0.3 to 2, in particular form 0.4 to 1, preferably from 0.4 to 0.8. Accordingly, the radius of the bearing surface 54 is at most twice the size of the thickness d of the anchor 36. The radius r of the bearing surface 54 is advantageously smaller than the thickness d of the anchor 36. Twice the radius r is advantageously significantly greater than the diameter c of the opening 71. Owing to the fact that the pivot joint 50 is arranged on that side of the anchor 36 which faces the electromagnet 33 and has a greater extent than the opening 71, the anchor 36 is secured on the anchor pin 55 by the partial ball section 56 secured on the anchor pin 55. The anchor 36 is arranged between the fastening section 69 (FIG. 12) of the pivot lever 28 and the pivot joint 50 and is secured by them in the longitudinal direction of the anchor pin 55.

In the embodiment, the partial ball section 56 protrudes over that end side of the anchor 36 which faces the electromagnet 33, and extends into the free space formed between the limbs of the yoke 34. As a result, the magnetic flux in the anchor 36 is impaired comparatively little and a low overall height is realized. The anchor 36 is fixed on the anchor pin 55 without additional fastening means. However, it may also be expedient to arrange the pivot axes 51, 52 of the anchor 36 in the contact plane 57 or on that side of the contact plane 57 which faces away from the yoke 34.

Figure 14:
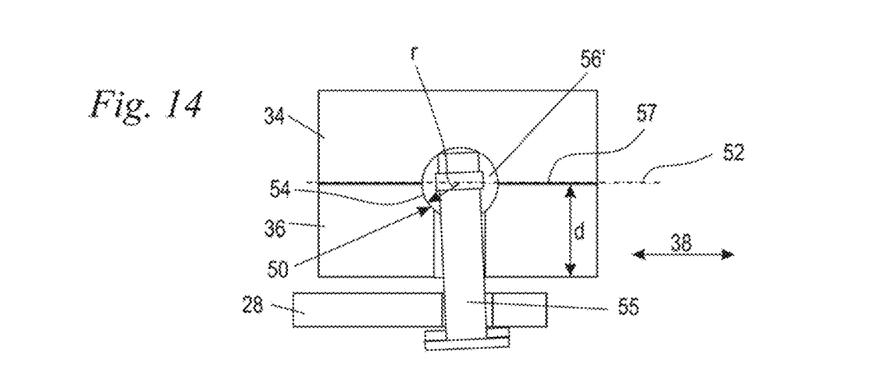
FIG. 14 is a schematic of an embodiment of the invention.

It can be advantageous to provide a ball, roller or partial roller instead of the partial ball section 56. In the case of a roller and partial roller, the anchor 36 can tilt only about an axis lying parallel to the contact plane 57, whereas, in the case of a ball and partial ball, tilting about all axes running through the ball centerpoint and lying parallel to the contact plane 57 is possible. The above features of the partial ball section 56 and the arrangement of the pivot axes 51 and 52 are also advantageous —possibly in adapted form —for a ball, roller and partial roller. FIG. 14 shows an embodiment of the pivot joint 50, in which the pivot joint is formed by a partial ball section 56'. The partial ball section 56' is a ball through which the anchor pin 55 protrudes. The centerpoint of the partial ball section 56 lies approximately in the contact plane 57. In the case of the embodiment according to FIG. 13, the centerpoint of the partial ball section 56, that is, the second pivot axis 52, lies on that side of the contact plane 57 which faces away from the anchor 36. The distance of the pivot axis 52 from the contact plane 57 is smaller than the radius r. Accordingly, the partial ball section 56 at least partially enters a depression of the anchor 36. FIG. 14 shows the arrangement after displacement of the yoke 34 in the transverse direction 38 in relation to the pivot lever 28. On account of the displacement, the anchor pin 55 is inclined. The pivot joint 50 has the effect that the anchor 36 can pivot in the opposite direction in relation to the anchor pin 55, and therefore the anchor 36 does not lift off from the yoke 34 at the contact surface 57. The holding forces are thereby maintained and are not reduced. That side of the anchor 36 which faces the yoke 34 lies in the contact plane 57.

Figure 15:
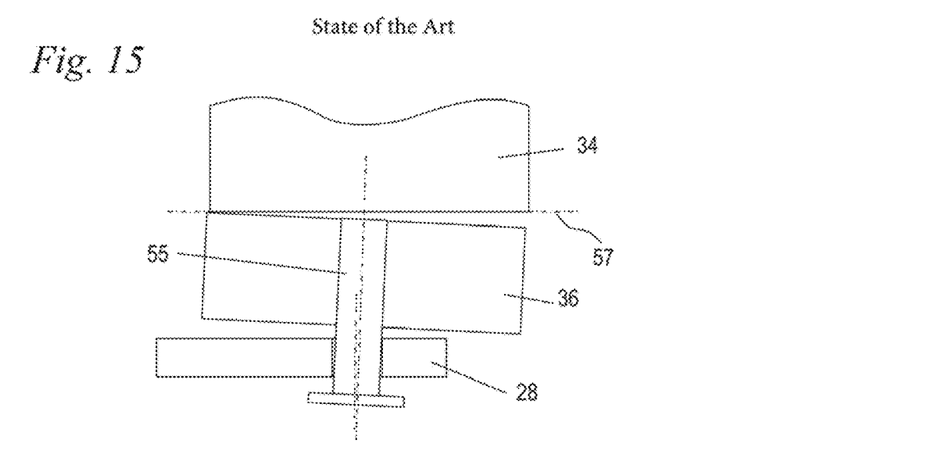
FIG. 15 is a schematic of an arrangement according to the prior art.

FIG. 15 shows an arrangement according to the prior art, wherein the same reference signs are used for the components corresponding to the invention. In the prior art, the anchor pin 55 is mounted pivotably in relation to the pivot lever 28. However, the anchor 36 is fixed on the anchor pin 55 for rotation therewith. If the anchor pin 55 tilts in relation to the pivot lever 28 on account of a relative movement of anchor 36 and electromagnet 33, the anchor 36 also tilts in relation to the contact plane 57 and thereby lifts off from the yoke 34. The holding forces of the electromagnet 33 can thereby be overcome, and the pivot lever 28 is adjusted into its release position.

Figure 16:
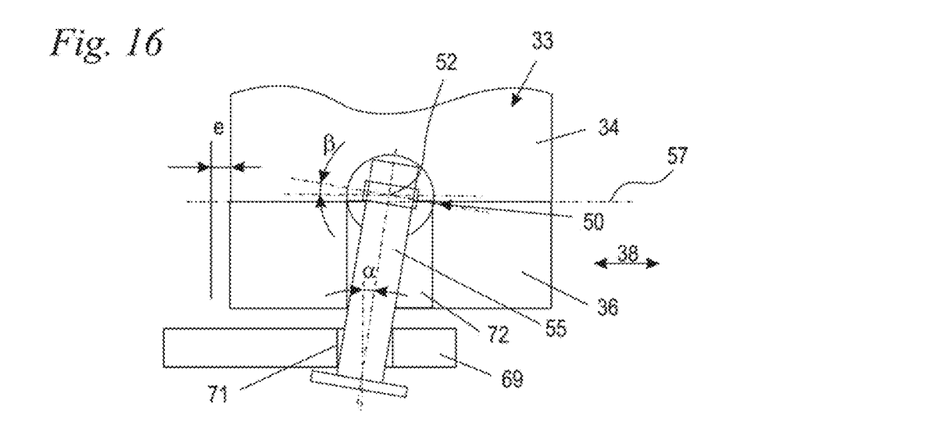
FIG. 16 is a schematic of the arrangement according to the invention.

FIG. 16 shows the arrangement according to the invention. In order to follow the electromagnet 33, which is displaced in the transverse direction 38, the anchor pin 55 tilts in relation to the fastening section 69 of the pivot lever 28 and the anchor 36 can pivot in the opposite direction in relation to the anchor pin 55. As a result, the anchor 36 remains in contact with the yoke 34 in the contact plane 57 on both longitudinal sides, and the anchor 36 does not lift off from the yoke 34. FIG. 16 shows the arrangement after the electromagnet 33 with the yoke 34 has been displaced in the transverse direction 38 by the displacement e which is the maximally occurring displacement during operation. On account of this displacement, the anchor pin 55 tilts about a tilting angle $\alpha$ in relation to its neutral position. The angle $\alpha$ can be, for example, from 5° to 20°, in particular from 8° to 15°. The anchor 36 pivots in the opposite direction in relation to the anchor pin 55 by a pivot angle $\beta$. The pivot angle $\beta$ by which the anchor 36 is pivotable in relation to the anchor pin 55, in particular about the pivot axis 52, is coordinated with the tilting angle $\alpha$ and is at least as large as the tilting angle $\alpha$. This ensures that complete compensation of the inclination of the anchor pin 55 is always, that is, up to the maximum displacement e, brought about by the pivot joint 50. The pivot angle $\beta$ is not only dependent here on the configuration of the pivot joint 50 but also on the geometry of the openings 71 and 72, the diameter b of the pivot pin 55 and the thickness d of the anchor 36.

The pivot joint 50 is advantageously formed from a dimensionally stable material. The anchor 36 is composed of metal. The bearing surface 54 on the anchor 36 is advantageously formed by the metal of the anchor 36. The partial ball section 56 which forms the counteracting bearing surface is advantageously composed of metal or dimensionally stable plastic.

The configuration of the mounting of the connection of the anchor with the anchor pin via a pivot joint and the guidance between the pivot lever and the electromagnet are advantageous configurations which are independent of one another. Further advantages emerge by the combination of the two inventions.

It is understood that the foregoing description is that of the preferred embodiments of the invention and that various changes and modifications may be made thereto without departing from the spirit and scope of the invention as defined in the appended claims.

What is claimed is:

1. A work apparatus comprising:
   a work tool;
   a brake assembly for said work tool;
   said brake assembly including a brake element and an actuating element for acting on said brake element;
   said actuating element being movable between a first position wherein said brake element does not brake said work tool and a second position wherein said brake element brakes said work tool;
   an anchor mounted on said actuating element and conjointly defining an interface therewith;
   said brake assembly having an electromagnet configured to fix said anchor in said first position of said actuating element;
   said electromagnet including a yoke and a coil surrounding said yoke;

a holding unit disposed at said interface and including an anchor pin for holding said anchor on said actuating element and a pivot joint;

said anchor being held via said pivot joint on said anchor pin so as to be pivotable about at least one pivot axis;

said yoke defining a contact plane whereat said anchor lies against said yoke when said actuating element is in said first position;

said at least one pivot axis lying parallel to said contact plane;

said yoke being displaceable in a direction parallel to said contact plane relative to said actuating element;

said anchor being tiltable relative to said anchor pin through a tilt angle β;

said anchor pin being tiltable relative to said actuating element through a tilt angle α; and, said tilt angle β being at least as large as said tilt angle α upon maximum displacement (e) of said yoke relative to said actuating element.

2. The work apparatus of claim 1, wherein said yoke is arranged on a first side of said contact plane and said yoke has a free space wherein those portions of said pivot joint and of said anchor pin which are arranged on said first side of said contact plane are accommodated.

3. The work apparatus of claim 1, wherein said actuating element is a pivot lever having a pivot axis; and, at least one pivot axis of said anchor lies in a plane arranged perpendicular to the pivot axis of said pivot lever.

4. The work apparatus of claim 1, wherein said pivot joint has a curved bearing surface.

5. The work apparatus of claim 4, wherein said bearing surface has a radius (r) and said anchor has a thickness (d); and, a ratio of said radius (r) to said thickness (d) lies in a range of 0.3 to 2.

6. The work apparatus of claim 1, wherein said anchor pin projects through said anchor and an attachment section of said actuating element; and, said anchor pin is pivotable relative to said actuating element.

7. The work apparatus of claim 1, wherein said pivot joint is made of a form stable material.

8. The work apparatus of claim 1, wherein said brake assembly includes:

a knee lever arrangement having first and second levers;

said first lever being pivotally journalled about a first pivot axis relative to said actuating element;

said second lever being pivotally journalled on said first lever about a second pivot axis;

a third lever configured to act on said brake element;

said second lever being mounted at a third pivot axis on said third lever;

said first pivot axis and said third pivot axis lying in a rocker arm plane; and, said second pivot axis being arranged on the same side of said rocker arm plane in said released position and in said fixed position.

* * * * *